3,481,895
PRODUCTION OF 1,3-DIENE POLYMERS IN AQUEOUS EMULSION

Herbert Naarmann, Ludwigshafen (Rhine), Joachim Stabenow, Kastanienweg, and Ernst-Guenther Kastning, Assenheim, Pfalz, Germany, assignors to Badische Anilin- & Soda-Fabrik Aktiengesellschaft, Ludwigshafen (Rhine), Germany
Filed Jan. 19, 1967, Ser. No. 610,436
Claims priority, application Germany, Jan. 22, 1966, B 85,503
Int. Cl. C08d 1/09, 1/24; C09d 5/02
U.S. Cl. 260—29.7      2 Claims

ABSTRACT OF THE DISCLOSURE

A process for the production of aqueous dispersions of 1,3-diene polymers having good flowability even when there is a comparatively high concentration of polymer and being particularly suitable for paints and for the production of foam rubber articles, comprising polymerizing the 1,3 - dienes, of desired in admixture with other monomers, in aqueous emulsion using new redox catalysts.

---

This invention relates to a new process for the production of aqeous dispersions of 1,3-diene polymers.

It is for example known from French Patent 899,224 that 1,3-dienes, such as butadiene, may be polymerized, if desired in admixture with vinyl aromatic compounds, such as styrene, acrylic compounds or methacrylic compounds, e g. acrylonitrile and acrylic esters, in aqueous emulsion using redox catalysts of at least two components to form elastomeric polymers. Mixtures of organic or inorganic peroxide compounds, e.g. hydrogen peroxide, ammonium persulfate, benzoyl peroxide, lauroyl peroxide or dicumyl peroxide, which are soluble in water and/or in the monomers, with reducing agents, which, like hydroquinone, sodium bisulfite and/or sodium formaldehyde sulfoxylate, are soluble in water at pH values above 7, are used as redox catalysts. In emulsion polymerization dispersing agents, such as fatty acid soaps, alkyl sulfonates and alkenoxylated alkyl and aryl sulfonates, are generally used.

Figure 1:
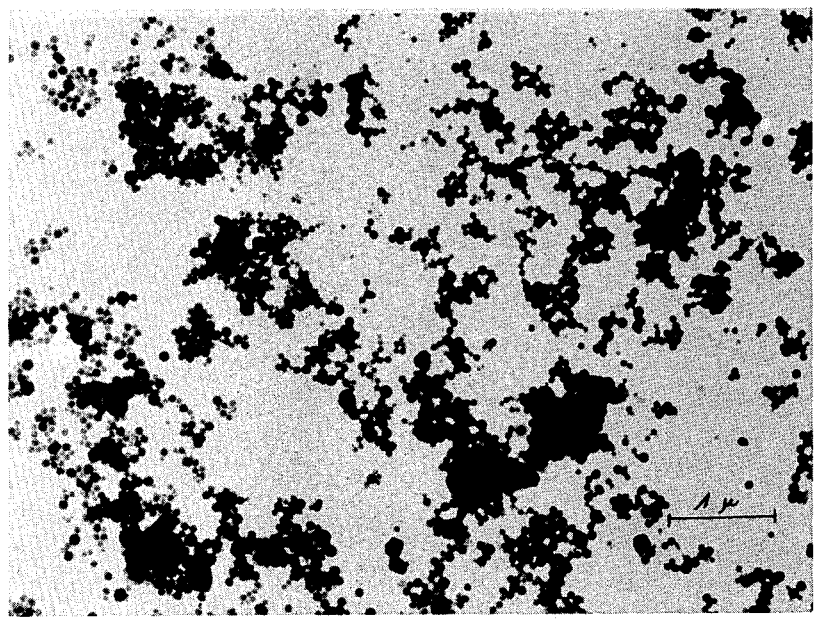

In these prior art methods for the emulsion polymerization of 1,3-dienes, however, dispersions in which the polymer particles generally have a diameter of less than 10 microns are obtained. Dispersions of this type have such a high viscosity even with comparatively low concentrations, e.g. a dry content of 30 to 40% by weight, that they can no longer be easily spread. Moreover, the merging together of the polymer particles in the production of coatings used such dispersions is unsatisfactory. The electron micrograph in FIG. 1 shows a polybutadiene emulsion which has been prepared in a conventional manner using redox catalysts. As can be seen from it, there are very many polymer particles in the dispersion which have a diameter of much less than 1 micron and only a few of slightly larger size. It can also be seen from FIG. 1 that the polymer particles merge together incompletely where they touch.

Figure 2:
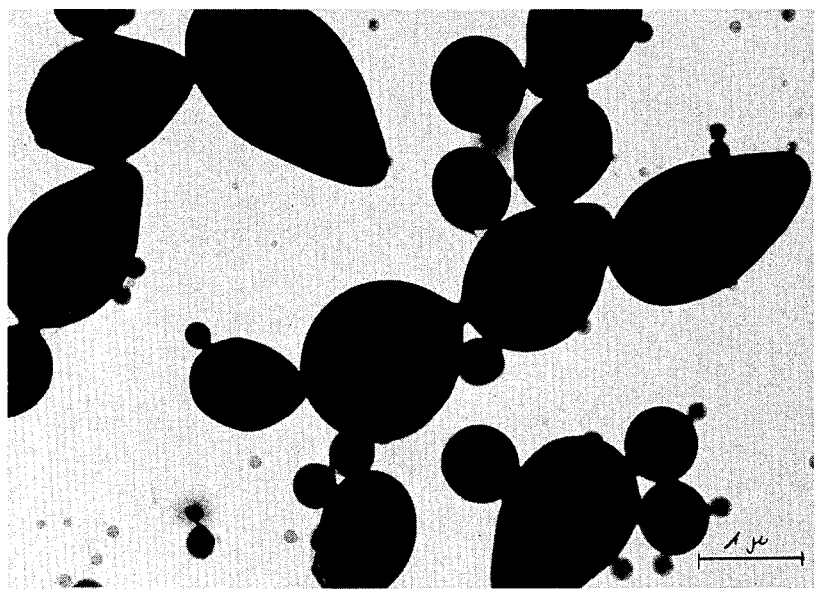

As FIG. 2 shows, natural latex, i e. emulsions of natural rubber, on the other hand exhibits for the most part large polymer particles having a diameter of 1 micron or more and only relatively few particles of a diameter of 0.1 micron or less. FIG. 2 also reveals that the polymer particles in natural latex merge together fairly easily (cf. in particular the two large particles in the middle of the figure). Since the far greater part of the polymers in natural latex are present in the form of relatively large particles, natural latex with the same dry content has a much lower viscosity and much better spreadability than a polybutadiene dispersion prepared in a conventional manner using redox catalysts.

Although the small polymer particles in polybutadiene dispersions which have been prepared using redox catalysts have been agglomerated to form large particles (cf. Houben-Weyl, "Makromolekulare Stoffe I," vol. 14, 508–515, Georg Thieme Verlag, Stuttgart, 1961) with the result that, the dispersions have reduced viscosity and improved spreadability, the ability of the particles to merge together is very greatly reduced. When such dispersions having polymer particles which have been agglomerated after polymerization are used for the production of coatings the following disadvantages result: reduced adherence and film strength as well as longer film formation periods.

An object of the present invention is to provide a process for the production of aqueous dispersions of 1,3-diene polymers in which the polymerization or copolymerization of 1,3-dienes, which is carried out in aqueous emulsion in an otherwise conventional manner, is controlled by the use of new redox catalysts in such a way that relatively large polymer particles are formed which readily merge together in the formation of films from the dispersion. Other objects of the invention will be evident to those skilled in the art from the following description.

We have now found that the production of 1,3-diene polymers by polymerizing 1,3-dienes in aqueous emulsion using redox catalysts of at least two components can be advantageously carried out by using redox catalysts in which the solubility of each component in the monomers under polymerization conditions is at least 1%. Particularly suitable 1,3-dienes for the new process are butadiene and isoprene. Other suitable 1,3-dienes are 2,3-dimethylbutadiene, 2-ethoxybutadiene, 2-phenylbutadiene and 2-chlorobutadiene. The 1,3-dienes may be polymerized alone or in admixture with each other.

In the process according to this invention part of the 1,3-dienes may be replaced by other monomers which are copolymerizable with the 1,3-dienes. The proportion of the comonomers is in general up to 50%, preferably up to 30% by weight with reference to the total amount of monomers. Particularly suitable comonomers are vinyl aromatic compounds, such as styrene, α-methylstyrene and vinyltoluenes; acrylic and methacrylic compounds, such as acrylonitrile, methacrylonitrile, acrylic and methacrylic acids and the esters and amides thereof; and heterocyclic vinyl compounds, such as vinylimidazole, vinylimidazolium salts and vinylpyridine. The acrylic and methacrylic esters which are suitable as comonomers are preferably derived from alkanols having 1 to 8 carbon atoms or cycloalkanols having 6 carbon atoms in the ring. Examples of suitable acrylic compounds are methyl acrylate, ethyl methacrylate, n-butyl acrylate, n-hexyl acrylate, cyclohexyl acrylate, tert.-butyl acrylate, isobutyl methacrylate, 2-ethylhexyl acrylate, acrylamide, methacrylamide, N-methylolmethacrylamide and N-methylolacrylamide. Di - n - butyl maleate and di-n-butyl fumarate are also suitable as comonomers. Styrene, acrylonitrile, tert.-butyl acrylate, n-butyl acrylate and, if desired, acrylic or methacrylic acid are preferred as comonomers.

The redox catalysts should consist of a mixture of at least two components. At least one of the components should behave to at least one of the other components like an oxidizing agent to a reducing agent, as is usual with redox catalysts. The redox catalyst may also contain several oxidizing and/or reducing substances provided that all the components of the redox catalysts under polymerization conditions should be soluble in the monomers to the extent of at least 1%, preferably at least 5%.

Particularly suitable oxidizing components for redox catalysts are all organic peroxy compounds and organic peroxide catalysts, such as acyl peroxides and acyl hydroperoxides of aliphatic and aromatic carboxylic acids having 1 to 10 carbon atoms, as well as alkyl hydroperoxides, cycloalkyl hydroperoxides, dialkyl peroxides, dicycloalkyl peroxides, aralkyl hydroperoxide and diaralkyl peroxides which have alkyl of cycloalkyl groups having 1 to 10 carbon atoms and optionally one or two benzine nuclei. Examples of suitable organic peroxy compounds are acetyl peroxide, lauroyl peroxide, benzoyl peroxide, cumene hydroperoxide, di-tert-butyl peroxide and pivaloyl peroxide.

Preferred oxidizing components are cumene hydroperoxide, cymene hydroperoxide, diisopropyl hydroperoxide, benzene peroxide, p,p'-dinitrobenzene peroxide, p,p'-dimethoxy peroxide, lauryl peroxide and peroxydicarbonic acid ester having the general formula ROC OOO COOR and diperoxycarbonic acid ester having the general formula ROO COOR, R in the general formula denoting an alkyl radical having 1 to 10 carbon atoms, a phenyl radical or alkyl phenyl radicals having 1 to 5 carbon atoms in the alkyl radicals.

Particularly suitable reducing components for redox catalysts are butadiene sulfone and derivatives thereof, e.g. alkyl-substituted butadiene sulfones and cycloalkyl-substituted butadiene sulfones, such as methyl-substituted butadiene sulfone, ethyl-substituted butadiene sulfone, 2,3-dimethyl-substituted butadiene sulfone, diethyl-substituted butadiene sulfone and 3-cyclohexyl-substituted butadiene sulfone as well as halogen substituted butadiene sulfone and halogen derivatives of butadiene sulfone, such as 3-chlorine-substituted butadiene sulfone, 3,4-dichlorine-substituted butadiene sulfone and 3-bromide-substituted butadiene sulfone. The alkyl-substituted butadiene sulfones preferably have alkyl and cycloalkyl groups having 1 to 10 carbon atoms, particularly linear or branched alkyl groups having 1 to 5 carbon atoms.

The amount of redox catalyst and the ratio of the oxidizing component to the reducing component are within the usual ranges for the emulsion polymerization of 1,3-dienes with redox catalysts in aqueous emulsion. 0.05 to 1%, preferably 0.1 to 0.5%, by weight of redox catalyst on the monomers is generally employed. In some cases 2% by weight of redox catalyst may be used. The ratio of the oxidizing component to the reducing component is usually between 50:1 and 1:1, preferably between 10:1 and 1:1. The relative proportion of the monomers to the aqueous phase is also within the usual range for the emulsion polymerization of 1,3-dienes, being generally between 0.5:10 and 15:10, preferably between 2:10 and 10:10.

The new process with regard to temperature and pressure conditions is carried out under the ones which are usual for the polymerization of 1,3-dienes in aqueous emulsion, if desired with the addition of conventional dispersing agents, stabilizers and regulators. Polymerization is usually carried out at temperatures between 0° and 100° C., preferably between 5° and 45° C., and at atmospheric pressure or pressures of from 1 to 50 atmospheres gauge, preferably between 3 and 10 atmospheres gauge. The process may be carried out continuously or batchwise, a polymerization time of 10 to 20 hours being generally sufficient for batch operation. In some cases particularly good results are achieved with shorter or even longer polymerization times. It is also possible in some cases to use small additions of those reducing components which are usual for redox catalysts.

Figure 3:
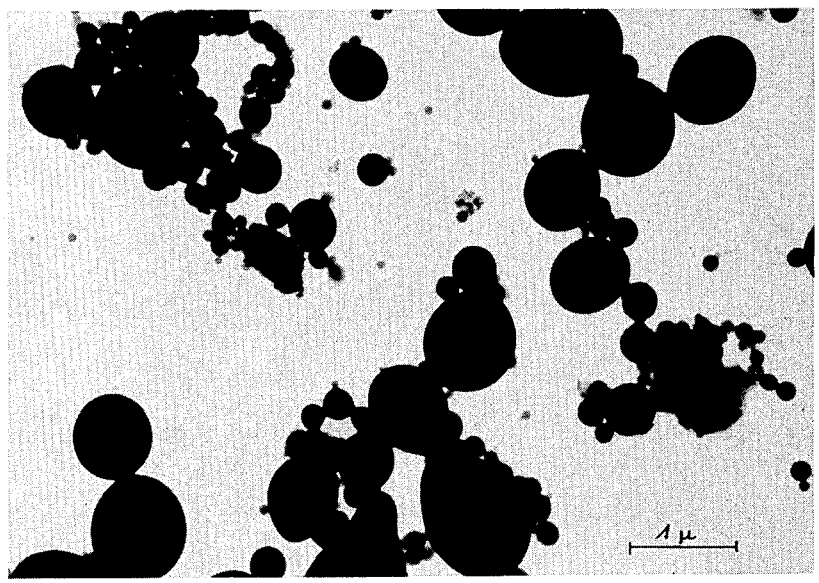

It is a particular advantage of the process according to this invention that it is possible to produce in one step, i.e. without an additional agglomeration step, aqueous dispersions of 1,3-diene polymers in which the greater part of the polymer, like natural latex, is present in the form of large particles having a diameter of 1 micron or more, and that only small amounts of the polymer are present in the form of particles whose diameter is much smaller than 1 micron and even below 0.1 micron. The electron micrograph in FIG. 3 shows a polybutadiene dispersion produced according to this invention. It reveals that the polybutadiene particles in this dispersion readily merge together like the polymer particles of a natural latex. The dispersions prepared according to this invention in comparison with conventionally manufactured 1,3-diene polymer dispersions exhibiting the same dry content have a much lower viscosity and are considerably easier to spread. For example a polybutadiene dispersion prepared according to this invention and having a dry content of 60% by weight exhibits the same viscosity and flow as a conventionally manufactured polybutadiene dispersion having a dry content of only 40% by weight which has not been subsequently agglomerated. The polymer particles in coatings which have been obtained using the dispersions prepared according to this invention merge together much better than those of conventionally manufactured aqueous dispersions of 1,3-diene polymers; the coatings exhibit particularly good adherence to cloths for example.

The dispersions prepared according to this invention are particularly suitable for the production of coatings and paints as well as for the production of foam rubber articles, if desired in admixture with natural and synthetic latices, for coating fabrics and as binders in the production of non-woven fabrics.

The invention is further illustrated by the following examples in which parts and percentages are by weight. The K values specified therein were determined according to H. Fikentscher, Cellulosechemie 13, 58 (1932).

EXAMPLE 1

Two solutions are metered separately and continuously in the course of 10 hours into a mixture of 100 parts of butadiene, 0.06 part of cumene hydroperoxide, 0.35 part of tert-dodecyl mercaptan, 190 parts of water, 4.7 parts of sodium salt of a resin acid, 0.7 part of sodium phosphate ($Na_3PO_4 \cdot 12H_2O$) and 0.01 part of disodium salt of ethylenediaminetetraacetic acid (dihydrate) at a temperature of 20° C. in an autoclave. Solution 1 contains 0.02 part of iron sulfate (heptahydrate), 0.025 part of disodium salt of ethylenediaminetetraacetic acid (dihydrate) and 10 parts of water.

Solution 2 contains 0.05 part of butadiene sulfone

and 10 parts of methanol.

Polymerization is discontinued after 15 hours by adding 0.015 part of dithiodimethyl carbaminate and 0.2 part of phenyl-β-naphthylamine. A dispersion is obtained with a dry content of 28% (equivalent to a butadiene conversion of about 60.5%). The polymer has a K value of 89 (0.5% in toluene) and a gel content of 2%.

When the butadiene sulfone according to this invention is used as reducing component, about 80% of the latex particles have a diameter of between 0.8 and 1.5 microns.

If 0.05 part of sodium formaldehyde sulfoxylate (dihydrate) is used instead of butadiene sulfone, a dispersion having a dry content of 24.5% is obtained under otherwise the same conditions with a butadiene conversion of 53%. About 80% of the latex particles have a diameter of between 0.01 and 0.5 micron and the polymer has a K value of 92 and a gel content of 7%.

EXAMPLE 2

The procedure of Example 1 is followed, but 70 parts of butadiene is employed and a mixture of 0.05 part of butadiene sulfone and 30 parts of styrene is used as Solution 2. The polymerization temperature is 25° C. and the total polymerization time is 15 hours. To discontinue polymerization, 0.015 part of dithiodimethyl carbaminate and 0.2 part of a conventional stabilizer are added. The conversion is 67% of the monomers and a dispersion having a dry content of 31% is obtained. The K value of the polymer is 91 and its gel content 1%. About 85% of the latex particles have a diameter of between 0.8 and 1.7 microns.

If the butadiene sulfone is replaced by sodium formaldehyde sulfoxylate (dihydrate), a dispersion of a polymer is obtained which has a K value of 94 and a gel content of 5%. About 80% of the latex particles have a diameter of between 0.01 and 0.6 micron.

EXAMPLE 3

The procedure of Example 2 is followed, but 4.7 parts of a potassium salt of an ethylenically unsaturated fatty acid mixture having an iodine number of 40 to 50 as emulsifier is used instead of the sodium salt of a resin acid. A dispersion having a dry content of 26% is obtained with a monomer conversion of 56%. The polymer has a K value of 87 and a gel content of 0.5%.

If the butadiene sulfone is replaced by 0.05 part of sodium formaldehyde sulfoxylate (dihydrate), the conversion is 53% of the monomers and a dispersion is obtained which has a dry content of 24.3% and contains a polymer having a gel content of 5%.

EXAMPLES 4–14

The procedure of Example 1 is followed, but cumene hydroperoxide is replaced by the peroxides and hydroperoxides given in the following table. The dry content and the particle size of the greater part of the polymers as well as their K values are also indicated in the table below.

| No. | Amount in parts | Peroxide | Dispersion's dry content in wt. % | K value | Particle size in microns |
|---|---|---|---|---|---|
| 4 | 0.06 | pinane hydroperoxide | 29 | | 83% 0.8–1.3 |
| 5 | 0.8 | benzoyl peroxide | 26 | 79.5 | 70% 0.8–1.2 |
| 6 | 0.7 | p,p'-dinitrobenzoyl peroxide. | 25 | 76 | 70% 0.8–1.2 |
| 7 | 0.9 | lauryl peroxide | 26.5 | 83 | 70% 0.8–1.2 |
| 8 | 0.4 | diethylperoxycarbonic acid ester | 28.5 | 92 | 80% 0.8–1.4 |
| 9 | 0.5 | ditolylperoxycarbonic acid ester | 28 | 91 | 80% 0.8–1.4 |
| 10 | 0.3 | di-t-butyldiperoxycarbonic acid ester | 28.5 | 93 | 80% 0.8–1.5 |
| 11 | 0.6 | α-methoxyperacetic acid ethyl ester | 28 | 92 | 80% 0.8–1.5 |
| 12 | 0.9 | 2,3-phenyl-3-tert-butylperoxyphthalide | 25 | 90.5 | 70% 0.8–1.1 |
| 13 | 0.5 | 3-phenyl-3-butylperoxyphthalide | 26.5 | 91 | 80% 0.8–1.3 |
| 14 | 0.5 | γ-tert-butyl-peroxyvalerolactone | 27 | 93 | 80% 0.8–1.3 |

We claim:
1. In a process for the production of aqueous dispersions of 1,3-diene polymers by polymerizing 1,3-dienes in aqueous emulsion with the addition of redox catalysts of at least two components, the improvement which comprises using as redox catalysts mixtures of
   (a) organic peroxide catalysts, and
   (b) butadiene sulfone or derivatives of butadiene sulfone, (a) and (b) together totalling 0.05 to 2% by weight on the monomers.
2. The improvement as claimed in claim 1, wherein mixtures of
   (a) peroxide catalysts from the group of acyl peroxides, acyl hydroperoxides, alkyl hydroperoxides, cycloalkyl hydroperoxides, dicycloalkyl peroxides, aralkyl hydroperoxides and diaralkyl hydroperoxides and
   (b) butadiene sulfone, an alkyl derivative of butadiene sulfone, a cycloalkyl derivative of butadiene sulfone or a halogen derivative of butadiene sulfone are used as redox catalysts, (a) and (b) together totalling 0.05 to 2% by weight on the monomers.

References Cited
UNITED STATES PATENTS

| | | | |
|---|---|---|---|
| 2,606,893 | 8/1952 | Reynolds et al. | 260—84.3 |
| 2,635,083 | 4/1953 | Cordier | 260—67.5 |
| 2,715,115 | 8/1955 | Blanchette et al. | 260—84.3 |

MURRAY TILLMAN, Primary Examiner

W. J. BRIGGS, Sr., Assistant Examiner

260—82.1, 82.7, 84.3, 94.4